Oct. 27, 1931.    C. C. RUNNER    1,829,610
SWITCH
Filed May 17, 1928    2 Sheets-Sheet 1

Inventor:
Claude C. Runner,
by Charles E. Tullar
His Attorney.

Oct. 27, 1931.  C. C. RUNNER  1,829,610
SWITCH
Filed May 17, 1928   2 Sheets-Sheet 2
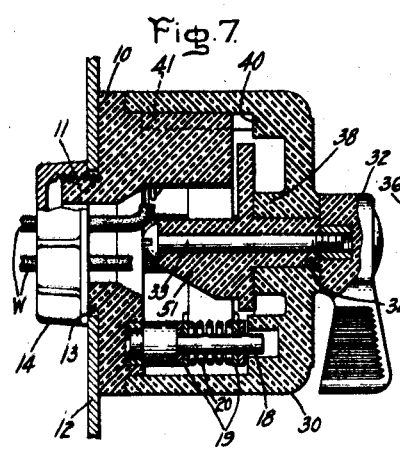
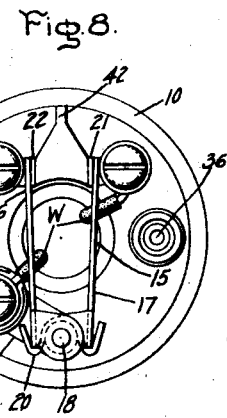
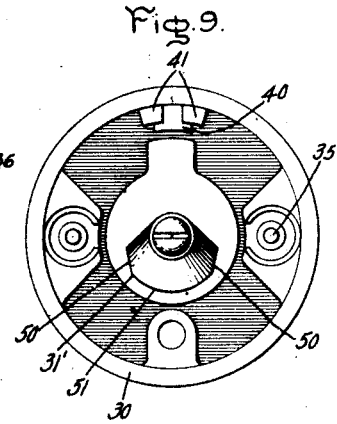
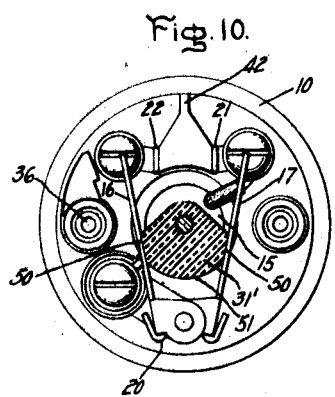
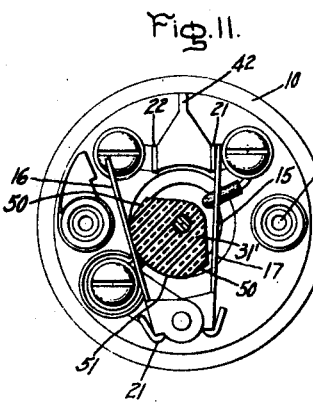
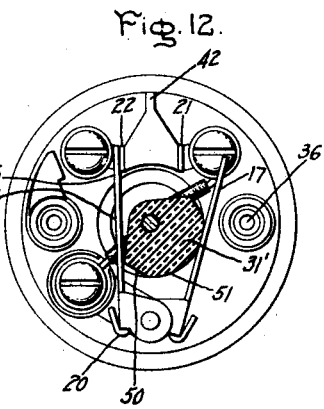
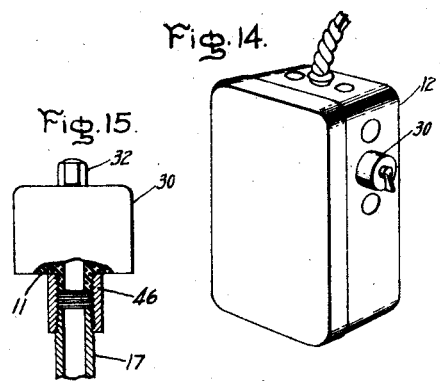
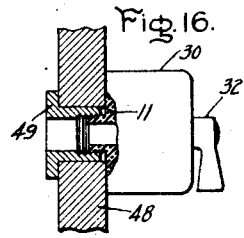
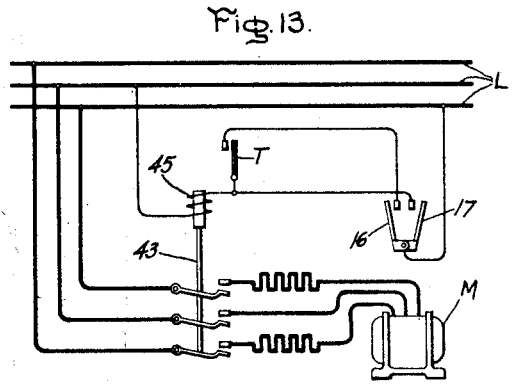
Inventor·
Claude C. Runner,
by Charles V. Mullan
His Attorney.

Patented Oct. 27, 1931

1,829,610

UNITED STATES PATENT OFFICE

CLAUDE C. RUNNER, OF SCHENECTADY, NEW YORK, ASSIGNOR TO GENERAL ELECTRIC COMPANY, A CORPORATION OF NEW YORK

SWITCH

Application filed May 17, 1928. Serial No. 278,591.

This invention relates to switches and more particularly to manually operated master switches adapted to control the energization of electro-responsive switches in motor control or other service.

One of the principal objects of the invention is to provide an improved form of manually operated master switch arranged so that it may be conveniently mounted in the usual knock out holes of enclosing casing of motor control panels or on standard outlet boxes such as used in conduit wiring or on the ends of the conduit pipe itself or on the unenclosed panel of a motor controller.

A further object of the invention is to provide a switch of the above character of inexpensive construction with all the live parts of the switch fully enclosed and effectively insulated so as to prevent any possibility of injury to the operator.

A still further object of the invention is to provide an improved switch structure of the above character that may be readily adapted to function as a starting and stop master controller in place of the usual start and stop push button stations, or may be adapted to function as a transfer switch having off-automatic-hand control positions for use with some form of automatic control switch such as a thermostat, pressure regulator, or the like.

Figure 1:
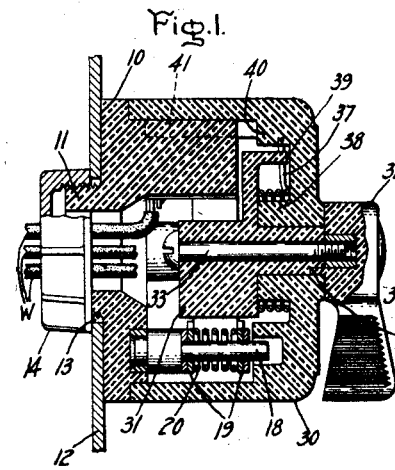
Figure 2:
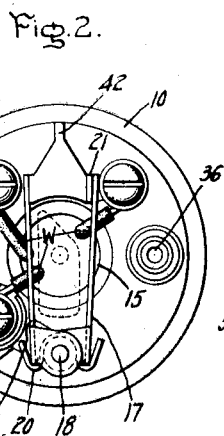
Figure 3:
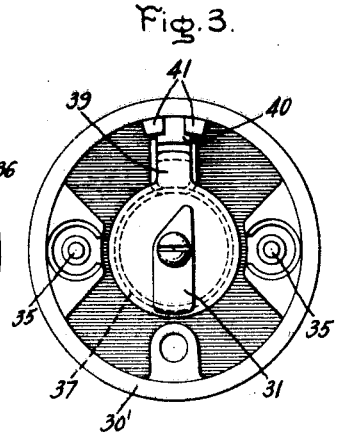
Figure 4:
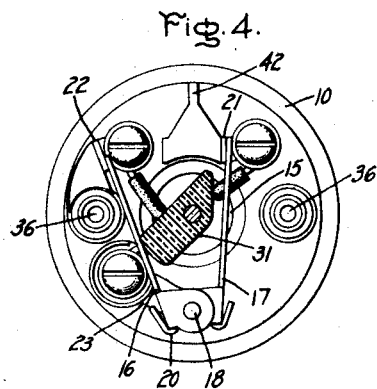
Figure 5:
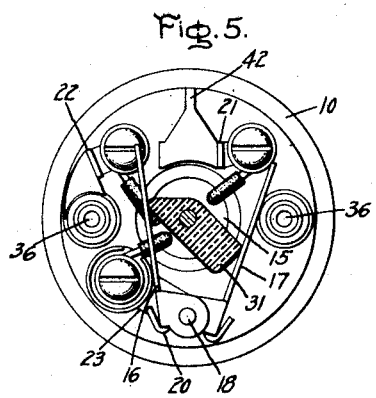
Figure 6:
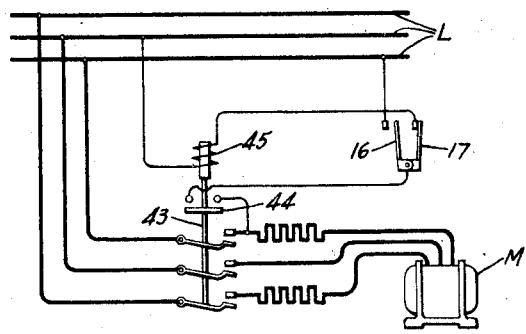

In the accompanying drawings which illustrate the preferred forms of master switch embodying the present invention, Fig. 1 is a view in cross section showing the switch adapted for start and stop duty with the switch mounted in operating position in an opening in a thin metal wall such as the wall of an enclosing casing for electromagnetic motor controllers; Fig. 2 is a plan view of the base of the switch and the operating parts carried thereby; Fig. 3 is an interior view of the removable cover portion of the switch with the operating parts carried thereby; Fig. 4 diagrammatically illustrates the relative positions of the switch elements when the switch is operated to the start position; Fig. 5 similarly illustrates the relative position of the switch elements when switch is operated to the stop position; Fig. 6 is a circuit control diagram showing the manner in which the start and stop master switch is connected to control the operation of an electromagnetically operated line switch for an electric motor so as to provide undervoltage protection; Fig. 7 is a view in cross section of the switch adapted for transfer service having hand-off-automatic positions with the switch mounted in the same manner as shown in Fig. 1; Fig. 8 is a plan view of the base of the switch adapted for transfer service; Fig. 9 is an interior view of the cover of the switch adapted for similar service; Figs. 10, 11 and 12 indicate diagrammatically the relative positions of the switch elements when the switch is operated respectively to the off-hand-automatic positions; Fig. 13 is a control diagram showing the manner in which the hand-off-automatic switch is connected to control an electromagnetically operated line switch for an electric motor; Fig. 14 is a perspective view of an enclosed type of motor starter having the improved form of master switch of the present invention mounted in a knock-out hole in the enclosing casing; Fig. 15 shows the control switch mounted on the end of a wiring conduit; Fig. 16 shows the manner in which the control switch is mounted directly on the panel of a motor starter.

Referring to Fig. 1 the improved control switch comprises a base portion 10 preferably formed of moulded insulating material with a screw-threaded projecting boss 11 for permitting the mounting of the switch in the various ways described in detail hereinafter. As illustrated in Fig. 1 the switch is mounted on a thin metal wall 12, such as the wall of the enclosing casing of a motor starter, with the screw-threaded projecting boss 11 extending through the knock-out opening 13 in the wall, and secured in place by the clamping end bushing 14 which is screwed on to the boss 11.

As shown in Fig. 2 the base 10 is of circular form and has a central opening 15 extending through the base and the boss 11 to permit entrance of the connecting wires W for connection with the switch contact parts. The two movable switch elements 16 and 17 are each pivotally mounted upon the pin 18 which is anchored at one end in the base 10. As illustrated, each of the switch elements 16 and 17 is provided with bent-over lugs 19 which form the pivotal connection with the pin 18. The biasing spring 20 surrounds the pivot pin 18 and is mounted between the bent-over lugs 19 and the hooked ends of the spring are engaged with the movable switch elements 16 and 17 so as to bias them to move together.

The stationary contact 21 is suitably anchored in the moulded base 10 and cooperates with the movable switch element 17. Likewise, the stationary contact 22 is similarly anchored in the base 10 and cooperates with the movable switch element 16. Thus the switch element 16 is normally open while the switch element 17 is normally closed due to the bias of the spring 18. Both of the stationary switch contacts 21 and 22 are bent over and tapped to receive the terminal binding screws for the connecting wires W as illustrated. The pivot pin 18 is mounted in a metal insert 23 which is likewise tapped to receive a binding screw for one of the wires W.

The movable switch elements 16 and 17, together with the stationary contacts, and the binding screws on the base 10, are totally enclosed within the cover portion 30 of the switch which as shown in Fig. 3 is of cylindrical form so as to fit over the cooperating shoulder 30' formed at the periphery of the base 10. The cover 30 carries the rotatable operating cam 31 by means of which the movable switch elements 16 and 17 are operated. As shown in Fig. 1 the cam 31 is rotatably mounted within the cover 30 and the operating handle 32 on the outside of the cover is secured to the cam 31 by the screw 33. In order to insure a strong operating connection between the handle 32 and the cam 31 the former is provided with a projecting portion 34 which interlocks with a corresponding recess in the end of the cam 31. The cover 30 is maintained in position on the base 10 by means of the holding screws 35 which extend from the outside through the cover into screw-threaded engagement with the inserts 36 anchored in the moulded base 10.

The operating cam 31 and the handle 32 are biased to a mid-position by means of the spring 37 which surrounds the boss 38 formed on the inside of the cover 30 with the ends of the spring disposed on opposite sides of the projecting lug 39 extending from the cam 31. The ends of the spring 37 also extend on either side of the projection 40 formed on the inside of the cover 30. Thus rotation of the handle 32 and cam 31 in either direction puts the spring 37 under tension to return to the same mid-position as shown in drawings.

In order to insure that the cover 30 is assembled on the base 10 in proper alignment to bring the operating cam 31 between the switch elements 16 and 17 as indicated by the dotted lines in Fig. 2, the cover is provided with the spaced apart guide lugs 41 extending substantially the full length of the cylindrical walls of the cover as shown in Fig. 1. Cooperating with the guide lugs 41 is the guide finger 42 formed on the base 10. Thus in mounting the cover on the base the finger 42 is centered between the guide lugs 41 and the cover guided in proper operating position on the base where it is secured by the screws 35 in the manner previously described.

The operation of the switch will be readily apparent from the previous description. Upon rotation of the operating handle 32 in a clockwise direction, the operating cam 31 is moved into engagement with the switch element 16 to operate the same from the open position to the closed position as illustrated in Fig. 4. It will be observed that the cam element 31 is so shaped that the switch element 17 remains in the closed position during the operation of the switch element 16. Upon rotation of the operating handle 32 in the counter-clockwise direction, the cam 31 is carried into engagement with switch element 17 and serves to operate the same from the normally closed position to the open position, as illustrated in Fig. 5.

Fig. 6 shows the manner in which the control switch is connected to provide stop and start control and also undervoltage protection for an electromagnetically operated motor line switch. In this figure the connection of the alternating current motor M to the 3 phase supply lines L is controlled by the electromagnet line switch 43 which is normally biased to the open position and is provided with the auxiliary contact 44. Upon closure of the switch element 16 in the manner previously described, the operating winding 45 is energized from one phase of the supply lines L through a circuit including both the switch element 16 and the switch element 17. Upon the resulting closure of the line switch, the auxiliary contact 44 shunts the starting switch element 16 and maintains the operating winding 45 energized through the switch element 17. Hence upon release of the operating handle of the control switch, the line switch 43 remains closed and motor M is maintained energized from the supply lines. In case of undervoltage the line switch 43 is free to open and remain open until the starting switch element 16 is again closed.

With the line switch 43 closed in the manner just described, operation of the switch element 17 from the normally closed position to the open position as shown in Fig. 5 serves to interrupt the energizing circuit of the operating winding 45 and thereby permit line switch 43 to open and disconnect the motor from the supply line.

Where the motor line switch 43 is mounted within an enclosing casing having a plurality of knock-out openings such as illustrated in Fig. 14, the master switch may be readily mounted in any one of the knock-out openings which is most convenient and accessible to the operator. With the projecting mounting lug 11 of the master switch of a size adapted to fit into the standard knock-out opening hole in the enclosing casing, it is only necessary to remove the knock-out at the desired position and insert the supporting lug 11 of the switch therein and screw up the clamping bushing 14 in order to secure the control switch in the desired operating position. Likewise it will be understood that in case it is desired to mount the control switch in a knock-out opening of a conduit box or other standard wiring fitting, this may readily be accomplished in the same way. Moreover the control switch may be mounted with equal facility on the end of a wiring conduit pipe as shown in Fig. 15. For this mounting a standard coupling 46 is screw-threaded on the end of the conduit and the projecting mounting lug 11 of the control switch is screw-threaded directly into the open end of the coupling. This permits the control wires W to be brought directly through the conduit pipe 47 into the control switch and secured therein by the binding screws. In case the motor starting switch 43 is mounted on an open panel such as the slate or asbestos compound panels in common use, the control switch may be conveniently mounted directly on the panel as shown in Fig. 16. For this mounting the panel 48 is drilled to receive a hollow mounting fixture 49, which is internally threaded at one end to receive the threaded supporting lug 11 of the control switch. Thus, it will be seen that the control switch of the present invention is particularly adapted to be mounted in the most convenient location for the operator with a minimum of trouble and expense.

The modified form of control switch shown in Fig. 7 is identical in construction with the switch previously described except for the following differences. The stationary contact 22 instead of being located on the base 10 so as to be normally out of engagement with the movable switch element 16, as shown in Fig. 2, is reversed so as to be normally in engagement with the movable switch element 16, as shown in Fig. 8. In addition the biasing spring for the operating cam 31 and handle 32 is omitted and the cam 31' is formed of a different shape than the cam 31 as indicated in Figs. 9, 10, 11 and 12. The modified cam 31' terminates in a conical or sloping face as indicated by the shaded lines in Fig. 9 so that when the cover 30 is mounted on the base, the cam 31' wedges between the movable switch elements 16 and 17 and thereby operates each element to the open position as illustrated in Fig. 10. In this position the switch elements engage with the flattened sides 50 of the cam element and in this way bias the cam and the operating handle to the mid-position due to the strain set up in the biasing spring 20 associated with the movable switch elements. This is the off position of the operating handle with both of the movable switch elements in circuit opening position.

Rotation of the operating handle in the clockwise direction serves to move the cam 31' out of engagement with the switch element 17 and thereby permits the element to move to the circuit closing position in accordance with its bias. The rounded cylindrical face 51 of the cam 31' located intermediate the flattened sides 50 frictionally engages with the switch element 16 and serves to maintain the cam and the operating handle in the position to which it is operated. Due to the omission of the biasing spring, it is necessary to manually return the operating handle and cam to the off position. Movement of the operating handle in a counter-clockwise direction permits the movable switch element 16 to close while maintaining the switch element 17 in the open position, as illustrated.

The modified form of control switch is intended to be used in place of two separate snap master control switches or a single pole double throw master control switch to provide hand-off-automatic control for magnetic motor starters or switches which are operated under the control of an automatic master switch, such as a thermostat, a pressure switch, float switch or the like.

The manner in which the modified form of master switch is connected is illustrated diagrammatically in Fig. 13. In this figure the alternating current motor M is connected to the 3 phase alternating current supply line L by means of the magnetic line switch 43 having the operating winding 45. The thermostat T represents the automatic control device which is intended to start and stop the motor M in accordance with predetermined conditions. Thus, when the master control switch is operated from the off position to close the switch element 16, as described in connection with Fig. 12, the energization of the operating winding 45 of the line switch is placed under the control of the thermostat T. When the thermostat operates to the circuit closing position, the line switch is energized and the motor is connected for operation from the supply lines. When the thermostat T is in the open position, the line switch is deenergized and the motor stopped. When it is desired to manually control operation of motor M independently of operation of the thermostat T, the control switch is operated to open the switch element 16 and permit the switch element 17 to close. This results in energization of the operating winding 45 of the motor line switch with resulting operation of the motor M. The return of the master control switch to the off position, as shown in Fig. 10, maintains both the switch elements 16 and 17 in the circuit open position and thereby insures that operation of motor M is stopped.

It will be apparent that the modified form of control switch shown in Figs. 7 to 12 may be mounted in a knock-out opening in an enclosing casing for the motor line switch or on the end of a wiring conduit pipe, or on a panel, in precisely the same manner as previously described. Thus the present invention provides a relatively simple and inexpensive construction for a control switch that adapts the switch for convenient mounting and for a variety of control services.

What I claim as new and desire to secure by Letters Patent of the United States is:

1. An enclosed master switch adapted for mounting in knockout holes and the like comprising a plurality of selectively operable contacts, a separable two-part enclosing casing therefor having the said contacts and wiring terminals therefor mounted in spaced relation on one part thereof within the casing and having operating means extending exterially of the casing for selectively operating the contacts, said casing being provided with a cylindrical threaded mounting boss extending from the said one part of the casing and adapted for mounting in a knockout hole or the like to support the entire switch thereon and said boss having an opening extending through the said one part of the casing adjacent said terminals for receiving the wiring connections for said terminals through the knockout hole or the like.

2. An enclosed master switch adapted for mounting in knockout holes and the like comprising a two-part enclosing casing of molded insulating material, one part of the casing having an integral screw threaded mounting boss projecting therefrom and provided with a wiring receiving opening extending through said boss into the casing, a pair of stationary contacts anchored in said one part in spaced apart relation at one side of said opening and having terminals disposed adjacent thereto, a pivot pin anchored in said one part on the opposite side of said opening and having a terminal adjacent thereto, a pair of movable contacts concentrically mounted on said pin and extending on different sides of said opening into cooperating relation with said stationary contacts, the other part of said casing being removably secured to said one part to enclose said contacts and terminals, and manually operable means extending exterially of the casing for selectively operating said movable contacts.

3. A switch comprising a base, a pivot pin extending therefrom, a pair of separately operable switch members mounted on the pivot pin and extending in spaced apart relation therefrom, cooperating stationary contacts mounted on said base, a common biasing spring associated with said switch members to bias the switch members into engagement with said stationary contacts, a cover removably secured to said base to enclose said stationary contacts and movable switch members, a cam element rotatably mounted between said separately operable switch members to control operation thereof in accordance with their bias and having flattened sides for simultaneously engaging with the switch members to hold the same out of engagement with the stationary contacts and permit the common biasing spring thereof to hold the cam element in a predetermined position and provided with a rounded face intermediate said flattened sides arranged to hold one of said switch members when the cam element is rotated in one direction and the other of said switch elements when the cam element is operated in the other direction, and an operating handle connected with said cam element and extending exterially of said cover.

4. A switch comprising a base member, a pair of rotatable contacts concentrically mounted on said base in spaced apart relation, a common biasing spring associated with said contacts to bias the contacts to move together, stationary contacts mounted on said base in cooperating relation with said movable contacts, a cover removably secured to said base, a cam element rotatably mounted in the interior of said cover in position to operate in the space between said movable contacts against the bias of said spring when the cover is secured to said base, and a handle on the exterior of said cover operatively connected with said cam member.

5. An enclosed switch comprising a circular base member of moulded insulating material having a concentric cylindrical screw threaded boss extending from one side thereof for mounting the switch and provided with an opening extending through the base and the boss for receiving the wiring connections for the switch, a plurality of fixed contacts and cooperating movable contacts mounted on said base and having terminals adjacent said opening, means for biasing the movable contacts into engagement with the fixed contacts, a cover removably secured to said base and having an operating cam rotatably mounted on the interior of the cover and provided with a tapering portion for wedging the movable contacts out of engagement with the stationary contacts when the cover is secured to the base, and a handle located on the outside of the cover and operatively connected with said cam element.

6. The combination of electroresponsive switch mechanism, an enclosing casing therefor having a plurality of knockout openings therein, a master switch having a plurality of pairs of relatively movable contacts for selectively controlling the energization of said electroresponsive switch mechanism and provided with mounting means adapted to be received in any selected one of said knockout openings, and control wiring connections extending between the electroresponsive switch mechanism and the master switch through the said mounting means in said knockout opening.

7. The combination of electromagnetically operated motor control switch mechanism, an enclosing casing therefor having a plurality of knockout openings therein, an enclosed master switch having a plurality of pairs of relatively movable contacts for selectively controlling the energization of said electromagnetically operated motor control switch mechanism and having a cylindrical screw threaded boss extending from the enclosing casing thereof and adapted to be received in any selected one of said knockout openings, said boss having an opening extending therethrough, control wiring connections extending between the said master switch and the said electromagnetically operated motor control switch mechanism through the said opening in said boss, and a threaded bushing surrounding said conductors and engaging with said boss for securing the master switch in position in the said opening.

In witness whereof, I have hereunto set my hand this 16th day of May, 1928.

CLAUDE C. RUNNER.